United States Patent [19]
Halvorsen, Jr.

[11] Patent Number: 6,033,213
[45] Date of Patent: Mar. 7, 2000

[54] HEATER FOR BENDING PLASTIC PIPE

[76] Inventor: Leif A. Halvorsen, Jr., 1335 N. Central Ave., Flagler Beach, Fla. 32136

[21] Appl. No.: 09/272,499

[22] Filed: Mar. 19, 1999

[51] Int. Cl.⁷ .......................................................... F24J 3/00
[52] U.S. Cl. .......................... 432/225; 432/224; 432/226; 219/521; 392/379
[58] Field of Search ..................... 126/271.2 R, 271.1 R, 126/229, 226; 432/225–227, 211, 230, 231, 232; 425/392; 34/201, 202, 231, 233, 234, 239; 392/379, 382; 219/521; 138/33

[56] References Cited

U.S. PATENT DOCUMENTS

| | | | |
|---|---|---|---|
| 778,016 | 12/1904 | Doran | 432/225 |
| 1,407,412 | 2/1922 | Harvey et al. | 432/226 |
| 2,881,755 | 4/1959 | Diehl | 126/271.1 |
| 3,466,020 | 9/1969 | Blinne | 432/225 |
| 3,957,032 | 5/1976 | Jelesko. | |
| 4,437,453 | 3/1984 | Temple et al. . | |
| 5,853,289 | 12/1998 | Todd | 432/225 |

*Primary Examiner*—James C. Yeung
*Attorney, Agent, or Firm*—Steven J. Rosen

[57] ABSTRACT

An apparatus for heating plastic pipe includes an outer housing having distal first and second open ends and a diffuser plate mounted inside of and spaced apart from the top of the outer housing. An inlet extending through the housing is positioned for directing heated air to impinge on the diffuser plate. A mount positions the diffuser plate within the housing such that when the plastic pipe is disposed in the housing through the open ends of the diffuser plate does not contact the pipe. First and second end caps are disposed at the distal first and second open ends respectively. The end caps have first and second apertures therethrough for supporting and centering the plastic pipe such that the diffuser plate does not contact the pipe.

15 Claims, 4 Drawing Sheets

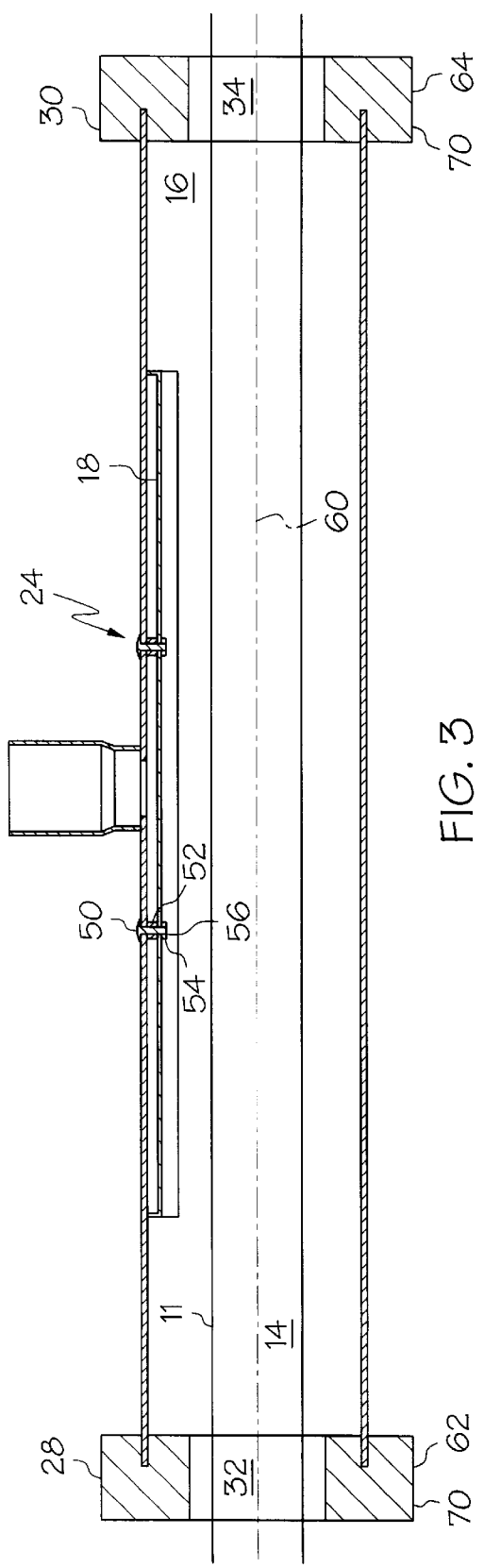
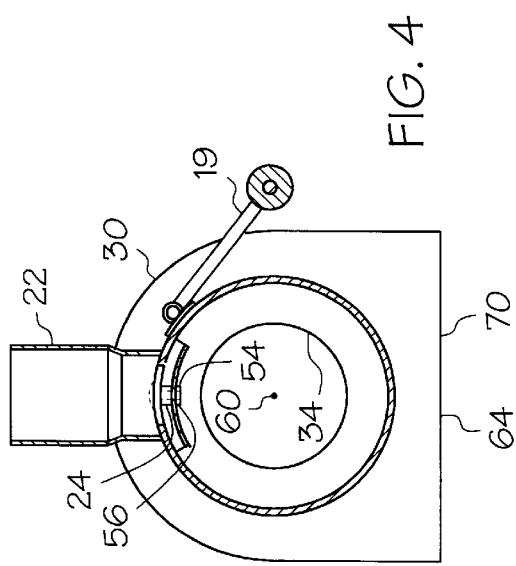

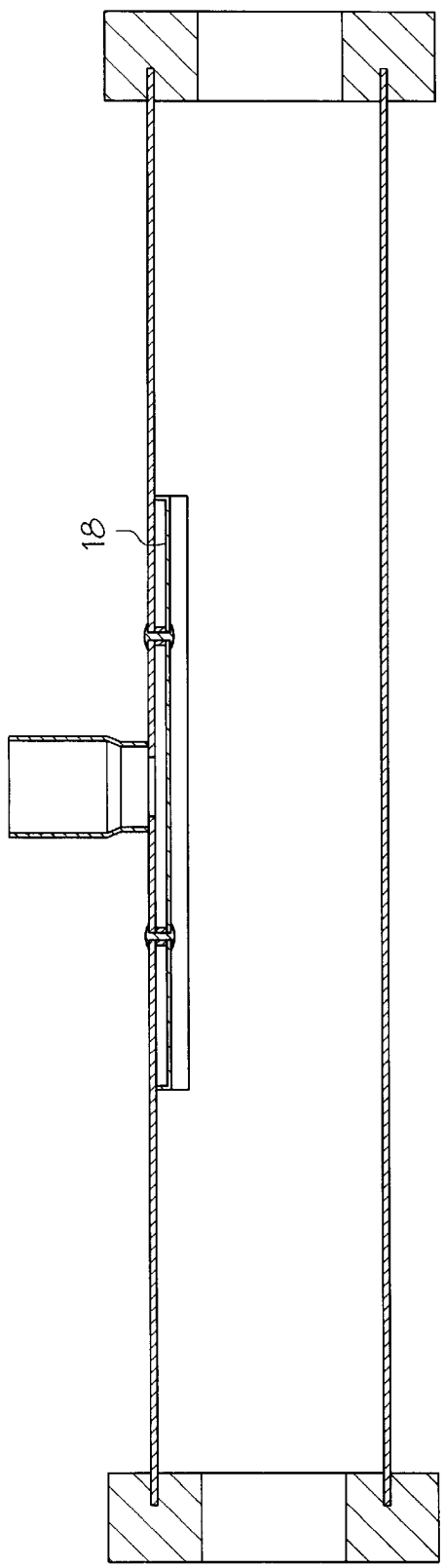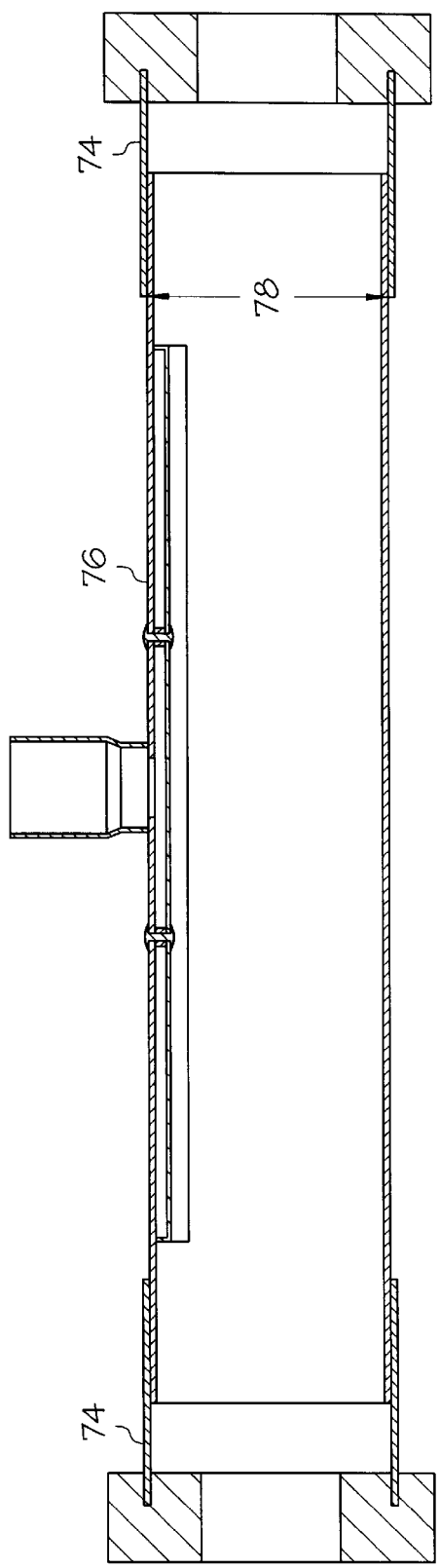

HEATER FOR BENDING PLASTIC PIPE

BACKGROUND OF THE INVENTION

1. Field of the Invention

The present invention relates generally to devices for heating plastic pipe for the purpose of bending the pipe and, more particularly, to portable devices for heating plastic pipe so that it can be bent to a desired angle.

2. Discussion of the Background Art

Contractors who work with plastic pipe often use a pipe heating device to bend pvc pipe in order to form a difficult angle which would otherwise require multiple fittings and cuts. An example of such a pipe heater is a Greenlee Textron's "Hot Box" which utilizes a resistance style heating element but which has the disadvantage of requiring a high degree of diligence on the part of the operator in that the pipe must be turned or rotated often to avoid overheating and or burning a portion of the pipe being heated. A heater that utilizes hot exhaust gasses from an internal combustion engine or other source is disclosed in Temple's U.S. Pat. No. 4,437,453. It has an internal fixed perforated diffuser that is not readily adaptable to alternate heat sources. The perforated diffuser remains in direct contact with the workpiece at all times during the heating process which provides uneven heat transfer. Because the diffuser supports the workpiece, it is more difficult to visually determine if the workpiece has become pliable.

SUMMARY OF THE INVENTION

An apparatus for heating plastic pipe includes an outer housing having distal first and second open ends and a diffuser plate mounted inside of and spaced apart from the top of the outer housing. An inlet through the housing is positioned for directing heated air to impinge on the diffuser plate. A mount positions the diffuser plate within the housing such that when the plastic pipe is disposed in the housing through the open ends the diffuser plate does not contact the pipe. First and second end caps are disposed at the distal first and second open ends, respectively. The end caps have first and second apertures therethrough for supporting and centering the plastic pipe such that the diffuser plate does not contact the pipe.

In a more particular embodiment, the outer housing is annular, the distal first and second open ends are circular, and the diffuser plate axially extends a portion of a distance between the open ends. The outer housing is preferably cylindrical and the diffuser plate is preferably annular extending circumferentially partially around an axis of the cylindrical housing. The mount includes an attachment means to removably attach different diffuser plates having different sizes including different lengths to the housing. Preferably, first and second flat surfaces on bottoms of the first and second end caps, respectively. The inlet preferably is an annular conduit mounted normal to the annular housing. One particular embodiment provides an adjustable length outer housing which is cylindrical.

ADVANTAGES OF THE INVENTION

This invention provides an inexpensive and portable means of heating pvc pipe that is designed to accommodate different pipe sizes and which is readily adaptable to various heat sources. It has the ability to utilize the intense heat as produced by an ordinary forced air heat gun. The diffuser never has to come in contact with the plastic pipe which is another advantage. This also allows the workpiece to sag to an extent as it becomes pliable, thereby, offering visible indications that the pipe has been sufficiently heated and is ready for bending. By using a larger diffuser when heating pipes of larger diameters, a larger area of the pipe being heated is brought to a pliable state which results in a more even and uniform bend. Smaller diameter pipe, requiring a smaller area of pliability in order to achieve a smooth and even bend, can utilize a smaller diffuser which has the effect of limiting the diffusion process and allowing more heat to localize near the center of the length of pipe. This affects a smaller area of the pipe which speeds the heating process when heating smaller pipe.

BRIEF DESCRIPTION OF THE DRAWINGS

The novel features believed characteristic of the present invention are set forth and differentiated in the claims. The invention is more particularly described in conjunction with the accompanying drawings in which:

FIG. 3 is a sectional schematic illustration of the apparatus through line 3—3 in FIG. 1;

FIG. 4 is a sectional schematic illustration of the apparatus through line 4—4 in FIG. 1;

FIG. 5 is a sectional schematic illustration of the apparatus with a shorter diffuser than the embodiment illustrated in FIG. 3; and FIG. 6 is a sectional schematic illustration of an adjustable length housing embodiment of the apparatus in FIG. 1.

DETAILED DESCRIPTION

Figure 1:
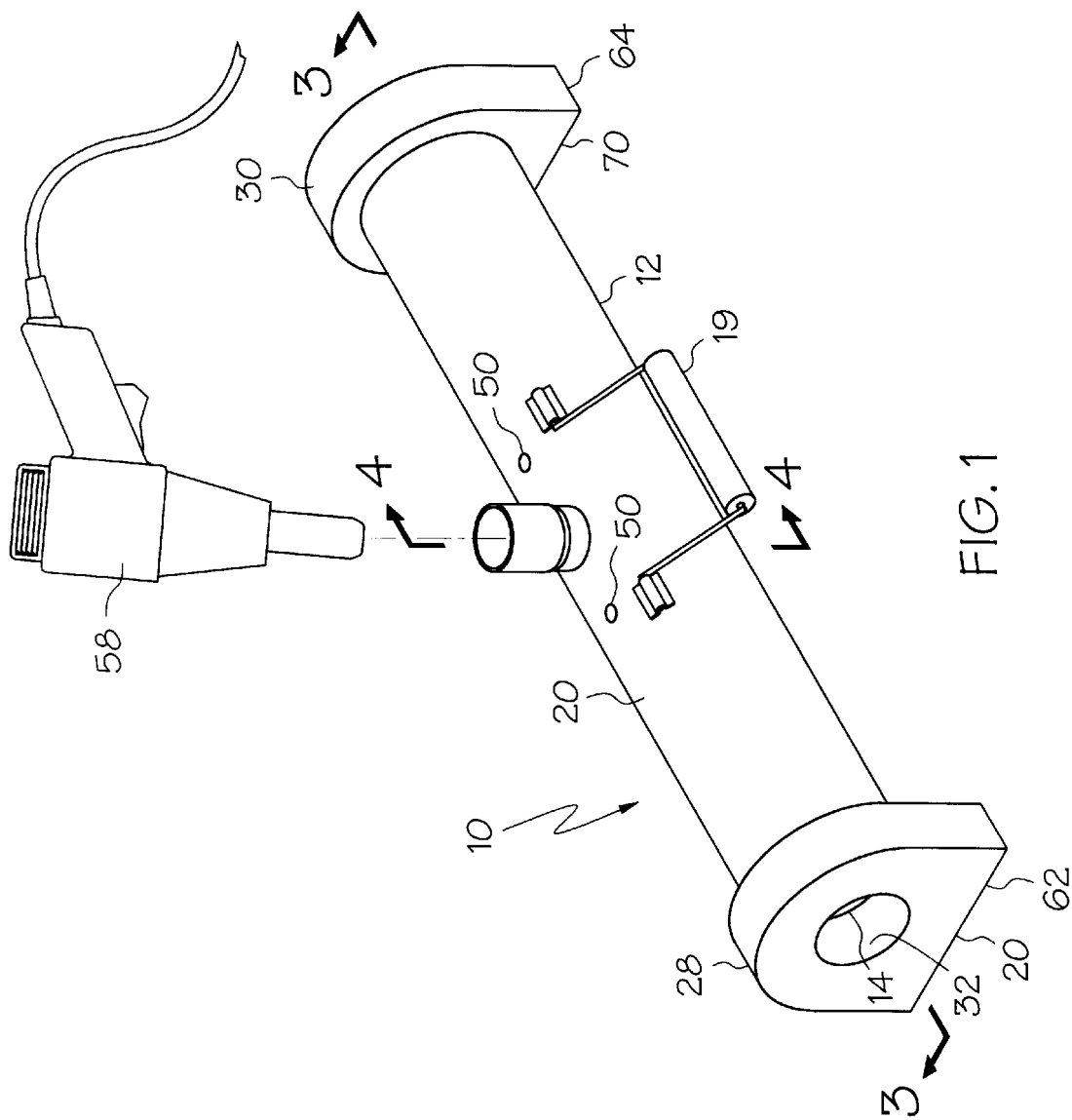
FIG. 1 is a perspective illustrative view of an apparatus for heating plastic pipe and a heat gun source of hot air.
Figure 2:
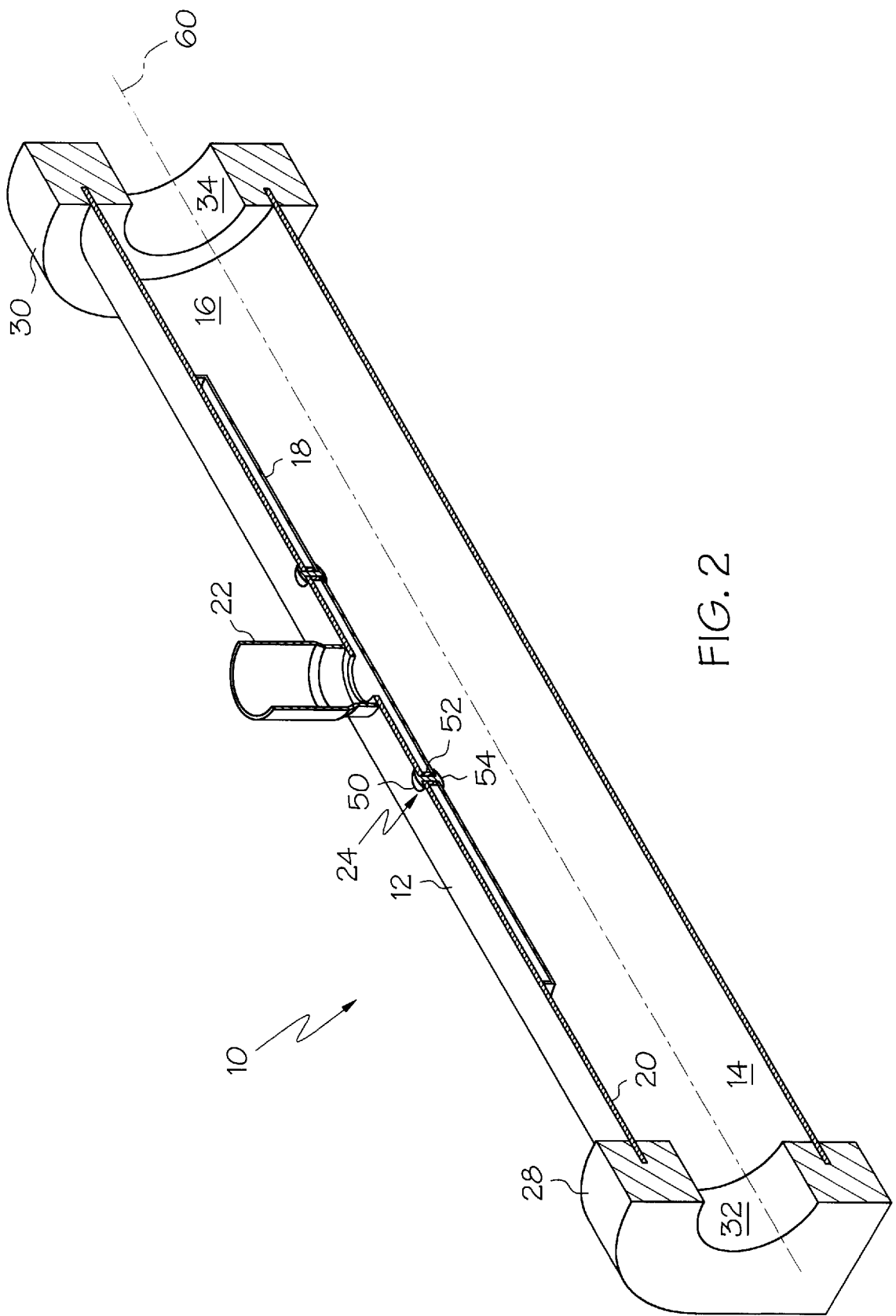
FIG. 2 is a cutaway perspective illustration of the apparatus in FIG. 1.

Illustrated in FIGS. 1, 2, 3, and 4 is an exemplary embodiment of the present invention, a heating apparatus 10 for heating plastic pipe 11 such as PVC pipe. An outer housing 12 having distal first and second open ends 14 and 16, respectively, has a diffuser plate 18 mounted inside of and spaced apart from a top 20 of the outer housing. The housing 12 is preferably annular and more preferably cylindrical as illustrated herein and includes a handle 19 for conveniently transporting the apparatus 10. An inlet 22 disposed through the housing 12 is positioned for directing heated air to impinge on the diffuser plate 18. The inlet 22 preferably is an annular or cylindrical conduit mounted normal to the housing 12. A mount 24 removably supports and positions the diffuser plate 18 within the housing 12 such that when the plastic pipe is placed in the housing through the first and second open ends 14 and 16, respectively, the diffuser plate does not contact the pipe. First and second end caps 28 and 30, respectively, are disposed at the distal first and second open ends 14 and 16, respectively. The first and second end caps 28 and 30, respectively, have first and second apertures 32 and 34, respectively, therethrough for supporting and centering the plastic pipe such that the diffuser plate 18 does not contact the pipe. This also allows the plastic pipe to sag to an extent as it becomes pliable which permits visible indications that the pipe has been sufficiently heated and is ready for bending.

The mount 24 is illustrated as a couple of screws 50 disposed through the housing 12 and spacers 52 between the housing 12 and the diffuser plate 18. Nuts 54 are welded to the plate 18 to receive threaded ends 56 of the screws 50 and slotted heads of the screws engage the outside of the housing 12. Alternatively, the diffuser plates 18 can be welded or otherwise fixed in place. One of the reasons a removable mount is preferred is so that different size pipes can be bent as well as using different lengths of the diffuser plates.

Using a larger diffuser plate when heating plastic pipes of larger diameters causes a larger area of the pipe being heated to be brought to a pliable state which results in a more even and uniform bend. Conversely, bending a smaller diameter pipe requires a smaller area of pliability in order to achieve a smooth and even bend for which using a smaller diffuser plate is better. This has the effect of limiting the diffusion process and allowing more heat to localize near the center of the length of pipe. This affects a smaller area of the pipe which speeds the heating process when heating smaller pipe.

The present invention allows an inexpensive and portable means of heating pvc pipe that is designed to accommodate different pipe sizes and which is readily adaptable to various heat sources such as the heat gun 58 illustrated in FIG. 1. The heat gun 58 may be easily used in any room or section of a building under construction or where the plastic pipe is being fitted. It has the ability to utilize the intense heat as produced by an ordinary forced air heat gun.

In the cylindrical embodiment of the outer housing 12, the distal first and second open ends 14 and 16, respectively, are circular and the diffuser plate 18 axially extends a portion of a distance between the open ends. The diffuser plate 18 is preferably annular or cylindrical extending circumferentially partially around an axis 60 of the cylindrical outer housing 12. Another preferred feature of the present invention is first and second flat surfaces 62 and 64, respectively, on bottoms 70 of the first and second end caps 28 and 30, respectively.

Illustrated in FIG. 5 is an adjustable length embodiment of the heating apparatus 10 with an adjustable length housing 12. Preferably, the housing 12 is axially segmented with telescoping end segments 74 that slide over an outside diameter 78 of a center segment 76 of the housing 12. It is obvious that more segments may be used for the housing 12.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention.

Accordingly, what is desired to be secured by Letters Patent of the United States is the invention as defined and differentiated in the following claims:

What is claimed is:

1. An apparatus for heating plastic pipe comprising:
   an outer housing having a top and bottom and distal first and second open ends;
   a diffuser plate mounted inside of and spaced apart from said top of said outer housing;
   said diffuser plate extending circumferentially partially around an axis and not in said bottom of said housing; and
   an inlet through said top of said housing for directing heated air to impinge on said diffuser plate.

2. An apparatus as claimed in claim 1 further comprising a mount positioning said diffuser plate within said housing such that when the plastic pipe is disposed in said housing through said open ends said diffuser plate does not contact the pipe.

3. An apparatus as claimed in claim 2 further comprising first and second end caps disposed at said distal first and second open ends respectively, said end caps having first and second apertures therethrough for supporting and centering the plastic pipe such that said diffuser plate does not contact the pipe.

4. An apparatus as claimed in claim 1 wherein:
   said outer housing is annular,
   said distal first and second open ends are circular, and
   said a diffuser plate axially extends a portion of a distance between said open ends.

5. An apparatus as claimed in claim 4 wherein said outer housing is cylindrical and said diffuser plate is annular extending circumferentially partially around an axis of said cylindrical housing.

6. An apparatus as claimed in claim 5 further comprising first and second end caps disposed at said distal first and second open ends respectively, said end caps having first and second circular apertures therethrough for supporting and centering the plastic pipe such that said diffuser plate does not contact the pipe.

7. An apparatus as claimed in claim 6 wherein said diffuser plate is removable and said mount further comprises attachment means to removably attach different diffuser plates to said mount within said housing.

8. An apparatus as claimed in claim 6 further comprising first and second flat surfaces on bottom of said first and second end caps respectively.

9. An apparatus as claimed in claim 8 wherein said inlet comprises an annular conduit mounted normal to said annular housing.

10. An apparatus as claimed in claim 4 wherein said outer housing is adjustable in length.

11. An apparatus as claimed in claim 10 wherein said outer housing is cylindrical and said diffuser plate is annular extending circumferentially partially around an axis of said cylindrical housing.

12. An apparatus as claimed in claim 11 further comprising first and second end caps disposed at said distal first and second open ends respectively, said end caps having first and second circular apertures therethrough for supporting and centering the plastic pipe such that said diffuser plate does not contact the pipe.

13. An apparatus as claimed in claim 12 wherein said diffuser plate is removable and said mount further comprises attachment means to removably attach different diffuser plates to said mount within said housing.

14. An apparatus as claimed in claim 13 further comprising first and second flat surfaces on bottom of said first and second end caps respectively.

15. An apparatus as claimed in claim 14 wherein said inlet comprises an annular conduit mounted normal to said annular housing.

* * * * *